UNITED STATES PATENT OFFICE.

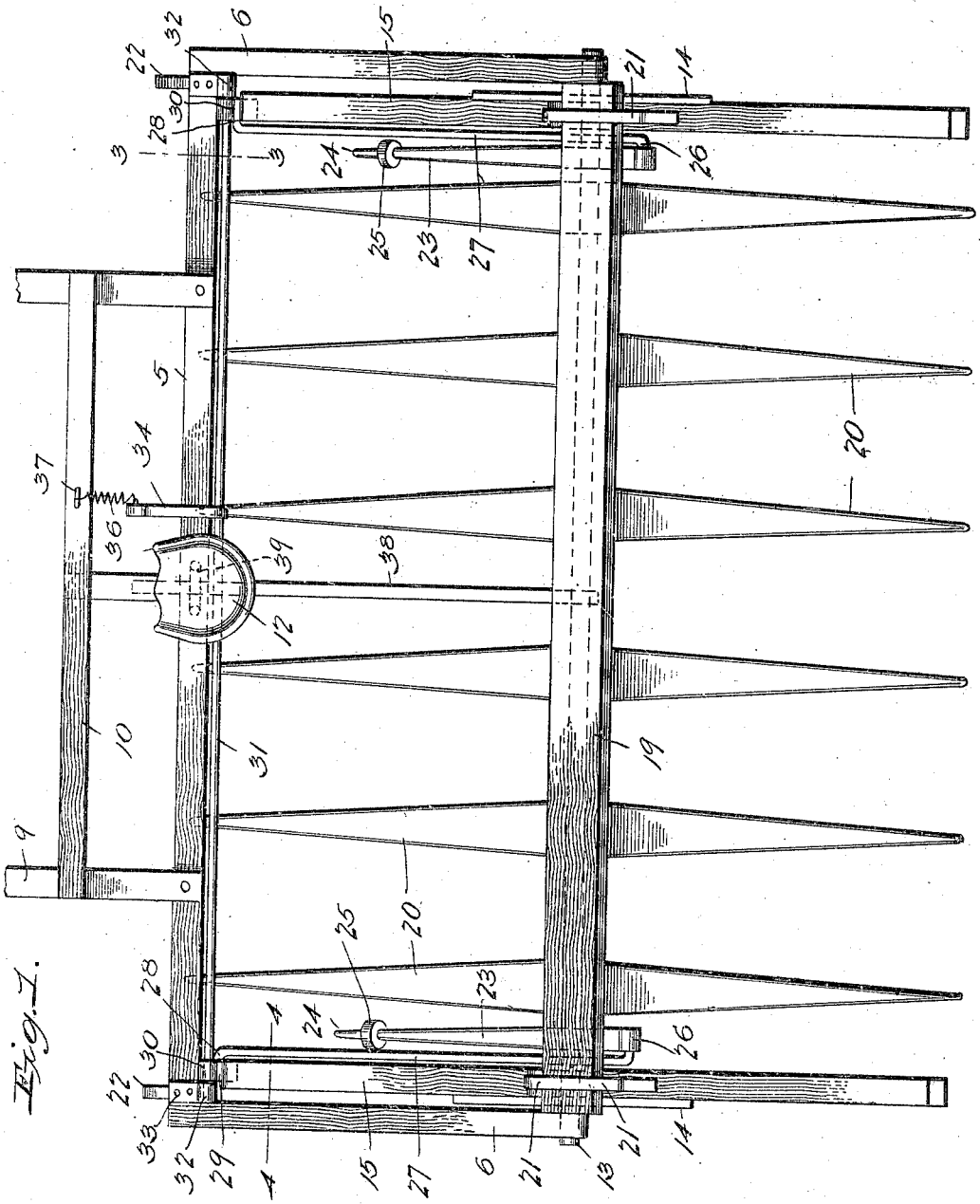

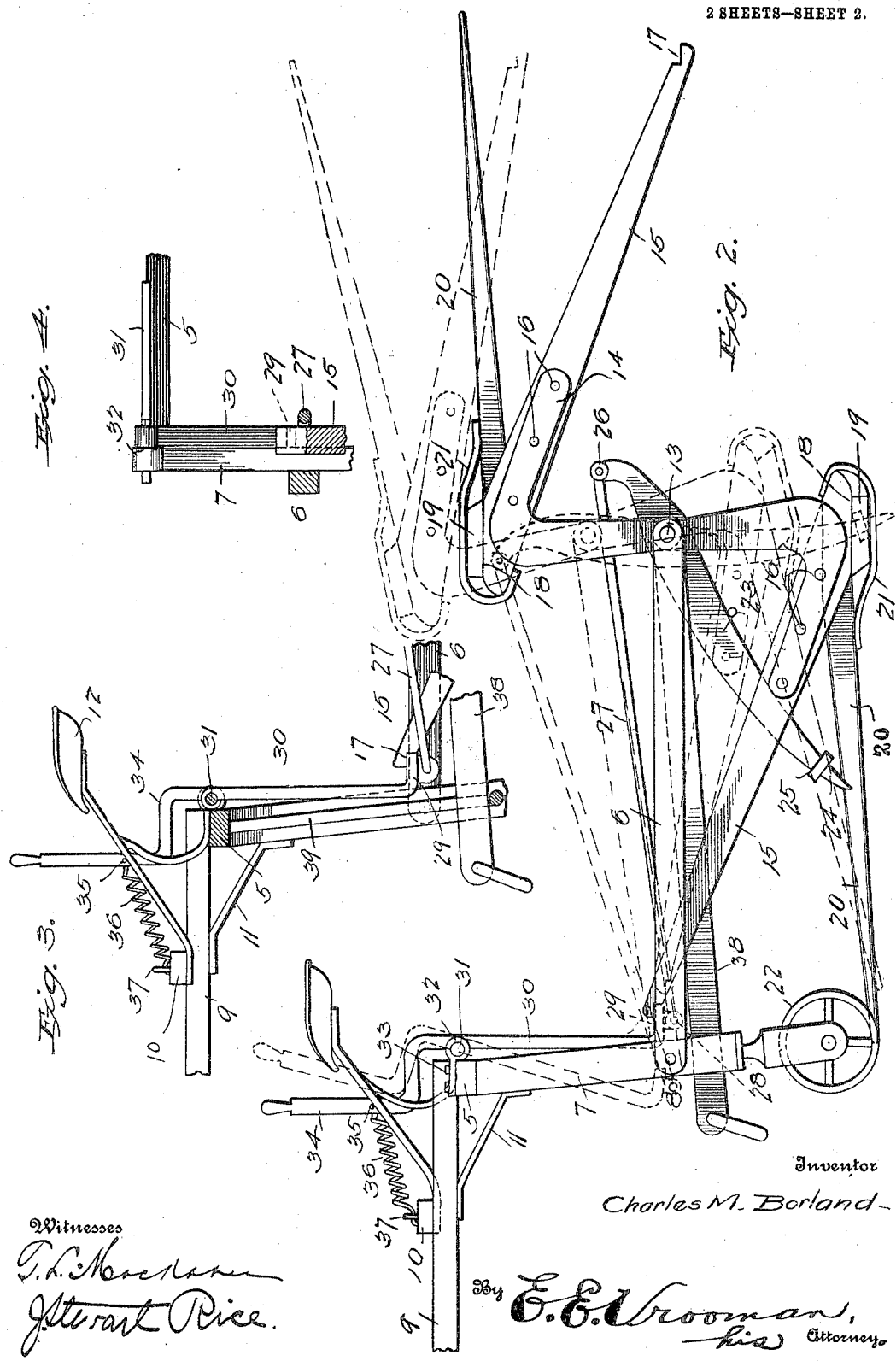

CHARLES M. BORLAND, OF ECHO, OREGON.

REVOLVING HAY RAKE AND BUNCHER.

951,675.     Specification of Letters Patent.     Patented Mar. 8, 1910.

Application filed October 27, 1908. Serial No. 459,783.

*To all whom it may concern:*

Be it known that I, CHARLES M. BORLAND, a citizen of the United States, residing at Echo, in the county of Umatilla and State of Oregon, have invented certain new and useful Improvements in Revolving Hay Rakes and Bunchers, of which the following is a specification, reference being had therein to the accompanying drawing.

My invention relates to revolving hay rakes and bunchers, and the object thereof is to provide means for gathering and dumping hay, alfalfa, and the like in *seriatim*.

The invention is directed to the employment of a pair of manually operated revolving rakes which, by virtue of their arrangement and construction, are reversible at will to present a new rake to the work and pass the other rake back to be stripped or dumped of the accumulation. To this end I utilize in conjunction with any suitable frame a double series of teeth and a pair of fulcrum elements, one at each side of the frame, which, taken in connection with certain appurtenant releasing mechanism, is designed to cause the rear part of the frame to ascend a sufficient distance to allow the rotation of the rakes or the alternate presentment thereof to the ground.

To the accomplishment of the recited object and others coördinate therewith, the preferred embodiment of my invention resides in that construction and arrangement of parts hereinafter described, illustrated in the accompanying drawings, and embraced within the scope of the appended claims.

In said drawings:—Figure 1 is a plan view of my invention. Fig. 2 is a view in side elevation showing the device in raking position and also, by dotted lines, in dumping position. Fig. 3 is an elevation partly in section of the forward part of the frame, the releasing mechanism mounted thereon and its appurtenance, the latter being broken away for the sake of convenience of illustration, and Fig. 4 is a fragmentary transverse sectional view taken along lines 4—4 of Fig. 1.

The frame constitutes essentially a cross beam (5), a pair of side beams (6) and a pair of uprights (7), the said side beams and the uprights being pivotedly connected, as at 8, and thills (9) having the cross bar (10) and the supporting brackets (11) are suitably superposed on said cross beam (5). A driver seat, such as 12, may be secured medially of the cross beam and the thills.

Secured to the outer ends of the side beams (6) is an axle (13), and rotatably mounted on the latter at points proximate opposite sides of the frame is a substantially Z-shaped angle iron (14) which is secured to the arms (15) by screws, bolts, or other equivalent fastenings, as 16, the said arms being in alinement and continuations of the parallel sides of the angle iron (14) and obviously extending in opposite directions. The outer distal end of each arm (15) is rabbeted, as at 17, the function of which will presently be set forth, the other distal end being beveled, as at 18, to afford a reliable connection for the transversely extending rake bar (19) having a plurality of teeth (20) angularly deflected with respect to the arms (15). Adjacent the terminals of each rake bar (19) I preferably secure a curvilinear shoe or skid (21). It will be pointed out in this connection, that the extremital portion of the teeth (20) when lying contiguous the ground occupy a position centrally of the wheels (22) so that when traversing a levee the teeth will be held close to the ground, the wheels ascending and descending commensurate with the undulatory surface of the earth.

To provide means for rotating the rakes, as an entirety, I employ a pair of fulcrum members (23) which are pivotedly secured to the axle (13) and each member has a pointed lower terminal (24) equipped with a limiting collar (25) and being connected at its upper terminal (26) to the rod (27), which latter extends to a point adjacent the lower proximal end of the upright (7), and at this point is held in pivotal engagement with the depending lug (28) formed as an integral part of the tripper or right angularly deflected end portion (29) of the rods (30), one of which is mounted on each distal end of the transversely extending rod (31), the latter being held in its proper relative position in the bearings (32), which are fastened to the cross beam (5) by means of bolts (33), and having secured thereto, centrally of its longitudinal extent, an operating lever (34) to which is connected, as at 35, one end of the coil spring (36), the other end of said spring being fastened to the staple (37) on the cross piece (10).

To furnish means for hitching a horse I have devised a bar (38) which is loosely mounted on the axle (13) and extends through a loop (39) on the underneath part of the cross bar (5).

In practical operation, and assuming the position exhibited in Fig. 2 of the accompanying drawings, the implement is drawn over the ground until a sufficient quantity of hay, alfalfa, or the like, has been gathered, whereupon the operator pulls the lever (34), which movement causes the trippers (29) to disengage the rabbeted portions (17) of the arms (15), and simultaneously, through the medium of the depending projections (28), formed as an integral part of the trippers, and the rods (27), the fulcrums (23) are brought to occupy a substantially vertical position, the pointed terminals (24) being forced into the ground up to the collars (25), thereby raising the rear of the machine to cause the point of the rake to engage in the ground, and thus rotate the set rakes. Both rakes are then rotated, the loaded rake delivering the accumulation upon the ground and the other rake assuming the position that was formerly occupied by the first mentioned rake. This operation proceeds until the entire field has been cleared, the rakes loading and unloading alternately in the manner just explained.

What I claim is:—

1. In a device of the character described, the combination of a frame, an axle therefor, a pair of rakes mounted on said axle, an arm for each rake, a pair of fulcrum members also mounted on said axle, and means for actuating said arms and causing said fulcrum members to engage the ground.

2. In a device of the character described, the combination of a frame, an axle therefor, rakes mounted on said axle, pointed fulcrum members also mounted on said axle, a limiting collar carried by each fulcrum member, and means for causing said fulcrum members to engage the ground.

3. In a device of the character described, the combination of a frame, an axle for said frame, Z-shaped angle irons mounted on said axle, rakes carried by said angle irons, fulcrum members also mounted on said axle, a limiting collar carried by each member, and means for causing said fulcrum members to engage the ground.

4. In a device of the character described, the combination of a frame, an axle therefor, rakes mounted on said axle, an arm for each rake having a rabbeted terminal, fulcrum members also mounted on said axle, and a lever carried by said frame and having a connection with the rabbeted portion of said arms and said fulcrum members, and adapted to simultaneously release said arms and cause said fulcrum members to engage the ground.

In testimony whereof I hereunto affix my signature in presence of two witnesses.

CHARLES M. BORLAND.

Witnesses:
C. B. WELLS,
C. B. GREENE.